(12) United States Patent
Zhong et al.

(10) Patent No.: US 12,333,630 B2
(45) Date of Patent: Jun. 17, 2025

(54) IMAGE PROCESSING METHOD AND APPARATUS, DEVICE, STORAGE MEDIUM AND PROGRAM PRODUCT

(71) Applicant: Beijing Zitiao Network Technology Co., Ltd., Beijing (CN)

(72) Inventors: Shanping Zhong, Beijing (CN); Chengcheng Yang, Beijing (CN); Linhui Li, Beijing (CN); Jiaxin Ma, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/786,172

(22) Filed: Jul. 26, 2024

(65) Prior Publication Data

US 2024/0386626 A1    Nov. 21, 2024

Related U.S. Application Data

(63) Continuation of application No. PCT/CN2023/072579, filed on Jan. 17, 2023.

(30) Foreign Application Priority Data

Jan. 28, 2022  (CN) .......................... 202210107352.1

(51) Int. Cl.
    *G06T 11/00*  (2006.01)
    *G06T 7/70*  (2017.01)

(52) U.S. Cl.
    CPC ................ *G06T 11/00* (2013.01); *G06T 7/70* (2017.01); *G06T 2207/30201* (2013.01)

(58) Field of Classification Search
    CPC .. G06T 11/00; G06T 7/70; G06T 2207/30201
    See application file for complete search history.

(56) References Cited

U.S. PATENT DOCUMENTS 10,269,164 B1   4/2019  Song et al.
2004/0210823 A1  10/2004  Miura et al.
(Continued)

FOREIGN PATENT DOCUMENTS

CN    104052935 A    9/2014
CN    105306802 A    2/2016
(Continued)

OTHER PUBLICATIONS

China National Intellectual Property Administration, Office Action Issued in Application No. 202210107352.1, Mar. 23, 2023, 22 pages.

(Continued)

*Primary Examiner* — Matthew Salvucci
(74) *Attorney, Agent, or Firm* — Alleman Hall & Tuttle LLP

(57) ABSTRACT

The present disclosure relates to an image processing method and apparatus, a device, a storage medium and a program product. The image processing method includes: in response to a startup operation on a first camera, obtaining a first initial video frame captured by the first camera; according to a first image editing effect, performing image editing processing on the first initial video frame to obtain a first target video frame and to display same; in response to a camera switching instruction, switching to a second camera and obtaining a second initial video frame captured by the second camera; and according to a second image editing effect, performing image editing processing on the second initial video frame to obtain a second target video frame and to display same.

20 Claims, 3 Drawing Sheets

(56) References Cited

U.S. PATENT DOCUMENTS

| | | | |
|---|---|---|---|
| 2015/0199816 A1 | 7/2015 | Freeman et al. | |
| 2018/0268615 A1 | 9/2018 | Smet et al. | |
| 2019/0098227 A1 | 3/2019 | Park et al. | |
| 2019/0360177 A1* | 11/2019 | Kiyota | B60R 1/23 |
| 2020/0336661 A1 | 10/2020 | Zhang et al. | |
| 2021/0029305 A1 | 1/2021 | Tang et al. | |
| 2021/0297595 A1 | 9/2021 | Li et al. | |
| 2022/0394191 A1 | 12/2022 | Wang et al. | |
| 2023/0156325 A1 | 5/2023 | Ogawa et al. | |
| 2023/0326110 A1 | 10/2023 | Sun et al. | |
| 2023/0360184 A1 | 11/2023 | Wu et al. | |

FOREIGN PATENT DOCUMENTS

| | | |
|---|---|---|
| CN | 105391965 A | 3/2016 |
| CN | 107820006 A | 3/2018 |
| CN | 108124094 A | 6/2018 |
| CN | 109618183 A | 4/2019 |
| CN | 110113526 A | 8/2019 |
| CN | 111240482 A | 6/2020 |
| CN | 111314617 A | 6/2020 |
| CN | 111327814 A | 6/2020 |
| CN | 112017137 A | 12/2020 |
| CN | 112135059 A | 12/2020 |
| CN | 112199016 A | 1/2021 |
| CN | 112672061 A | 4/2021 |
| CN | 112843723 A | 5/2021 |
| CN | 112862927 A | 5/2021 |
| CN | 113318438 A | 8/2021 |
| CN | 113938587 A | 1/2022 |
| CN | 114429506 A | 5/2022 |
| JP | 2001223924 A | 8/2001 |
| JP | 2002214688 A | 7/2002 |
| JP | 2005039451 A | 2/2005 |
| JP | 2011211561 A | 10/2011 |
| JP | 2015023382 A | 2/2015 |
| JP | 2016133977 A | 7/2016 |
| JP | 2018107765 A | 7/2018 |
| KR | 101942063 B1 | 1/2019 |
| WO | 2020259655 A1 | 12/2020 |
| WO | 2022019129 A1 | 1/2022 |

OTHER PUBLICATIONS

Huamán, C.Q. et al., "Authentication and integrity of smartphone videos through multimedia container structure analysis," Future Generation Computer Systems, vol. 108, Jul. 2020, 19 pages.
ISA China National Intellectual Property Administration, International Search Report Issued in Application No. PCT/CN2023/072579, Apr. 23, 2023, WIPO, 6 pages.
China National Intellectual Property Administration, Patent Grant Issued in Application No. 202210107352.1, Jan. 11, 2024, 8 pages.
Japan Patent Office, Notice of Refusal for Japanese Application No. 2024-544825, mailed Dec. 10, 2024, 6 pages.
European Patent Office, Extended European Search Report Issued in Application No. 23746122.3, Mar. 14, 2025, Germany, 10 pages.
Korean Intellectual Property Office, Office Action Issued in Application No. 10-2024-7028347, Jan. 21, 2025, Korea, 17 pages.
Japan Patent Office, Office Action issued in Application No. 2024-544825, Apr. 30, 2025, 7 pages.

* cited by examiner

IMAGE PROCESSING METHOD AND APPARATUS, DEVICE, STORAGE MEDIUM AND PROGRAM PRODUCT

CROSS-REFERENCE TO RELATED APPLICATIONS

The present disclosure is based on and claims the benefit of Chinese Patent Application for invention No. 202210107352.1, filed on Jan. 28, 2022, the disclosure of which is hereby incorporated into this disclosure by reference in its entirety.

TECHNICAL FIELD

The present disclosure relates to an image processing method and apparatus, a device, a storage medium, and a program product.

BACKGROUND

With the rapid development of Internet technology and terminal devices, various terminal devices such as mobile phones and tablet computers have become an indispensable part of people's work and life. Functions of various media software installed in smart terminals are becoming more and more powerful.

For example, operations on virtual image materials can be achieved through media software installed in smart terminals to simulate real environments. Based on such software, the need for real materials can be reduced, which can save costs and make it easier to count the results of operations.

SUMMARY

In a first aspect, an embodiment of the present disclosure provides an image processing method, comprising: obtaining a first initial video frame captured by a first camera in response to a startup operation on the first camera; determining a first image editing effect corresponding to the first camera; performing image editing processing on the first initial video frame according to the first image editing effect to obtain and display a first target video frame, wherein the first target video frame is an effect image showing an effect of applying the first image editing effect to the first initial video frame; in response to a camera switching instruction, switching to a second camera and obtaining a second initial video frame captured by the second camera; determining a second image editing effect corresponding to the second camera; and performing image editing processing on the second initial video frame according to the second image editing effect to obtain and display a second target video frame, wherein the second target video frame is an effect image showing an effect of applying the second image editing effect to the second initial video frame.

In a second aspect, an embodiment of the present disclosure provides an image processing apparatus, comprising: a first initial video frame obtaining module configured to obtain a first initial video frame captured by a first camera in response to a startup operation on the first camera; a first editing effect determination module configured to determine a first image editing effect corresponding to the first camera; a first target video frame obtaining module configured to perform image editing processing on the first initial video frame according to the first image editing effect to obtain and display a first target video frame, wherein the first target video frame is an effect image showing an effect of applying the first image editing effect to the first initial video frame; a second initial video frame obtaining module configured to, in response to a camera switching instruction, switch to a second camera and obtain a second initial video frame captured by the second camera; a second editing effect determination module configured to determine a second image editing effect corresponding to the second camera; and a second target video frame obtaining module configured to perform image editing processing on the second initial video frame according to the second image editing effect to obtain and display a second target video frame, wherein the second target video frame is an effect image showing an effect of applying the second image editing effect to the second initial video frame.

In a third aspect, an embodiment of the present disclosure provides an electronic device, comprising: one or more processors; and a storage device configured to store one or more programs that, when executed by the one or more processors, cause the one or more processors to implement the image processing method according to any one of embodiments of the first aspect.

In a fourth aspect, an embodiment of the present disclosure provides computer-readable storage medium stored thereon a computer program that, when executed by a processor, implements the image processing method according to any one of embodiments of the first aspect.

In a fifth aspect, an embodiment of the present disclosure provides a computer program product comprising computer programs or instructions that, when executed by a processor, implement the image processing method according to any one of embodiments of the first aspect.

In a sixth aspect, an embodiment of the present disclosure provides a computer program, comprising: instructions that, when executed by a processor, cause the processor to perform the image processing method according to any one of embodiments of the first aspect.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
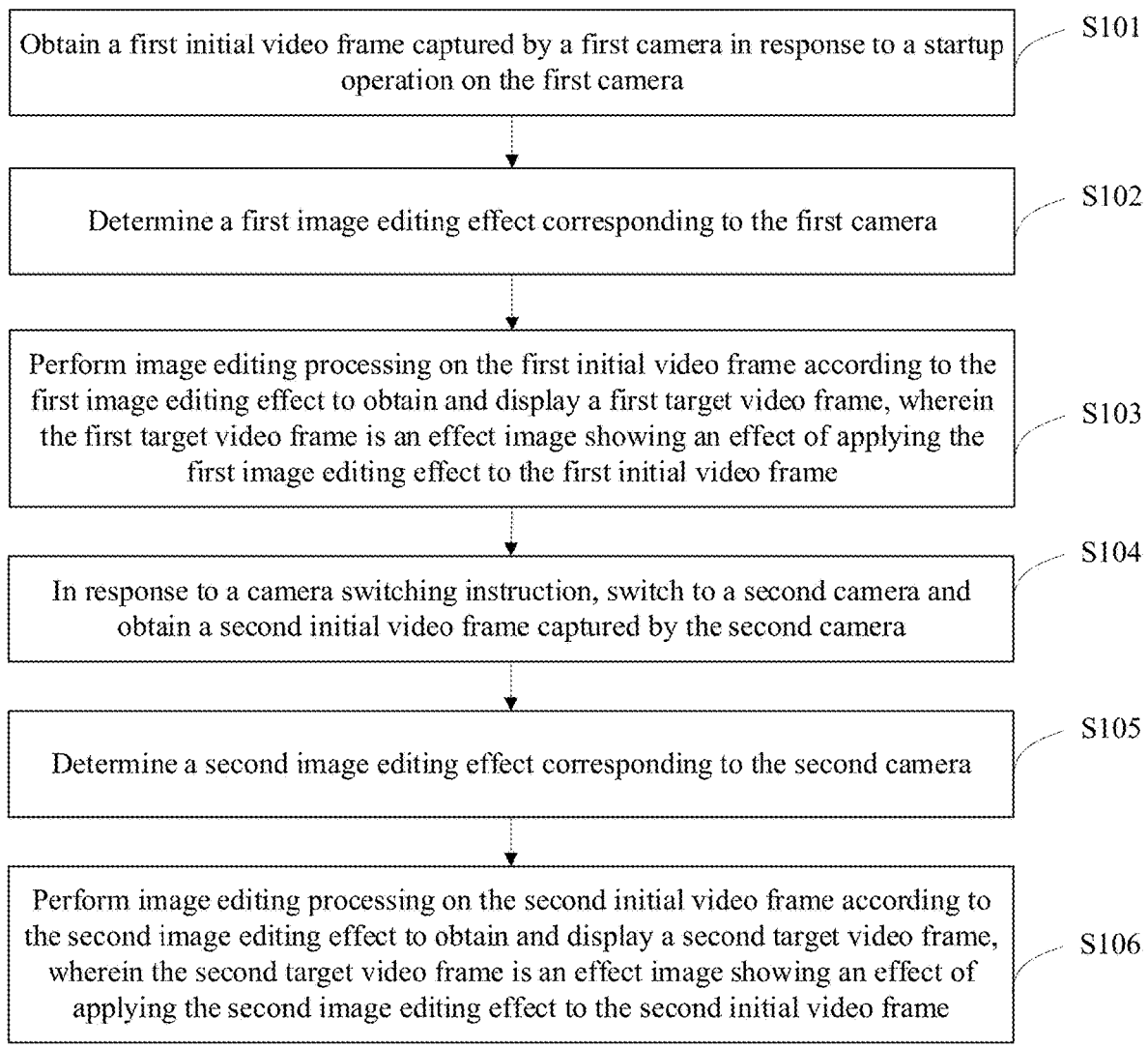
FIG. 1 is a flowchart of an image processing method in an embodiment of the present disclosure.

Exemplary embodiments of the present disclosure will now be described in detail below with reference to the accompanying drawings. Although some embodiments of the present disclosure are shown in the accompanying drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods of the embodiments may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

There are mainly two interaction ways for additional image material in the related art.

The first interaction way: when a specific image is detected in a video frame, a corresponding additional image material is added to the video frame and displayed. The specific image described above can be a face image, a foot image, a hand image, etc., For example, when a hand image is detected in a video frame, an image material of sugar-coated haws on a stick can be displayed at a hand position in the video frame.

The second interaction way: when a specific action of a user is detected in a video frame, a corresponding additional image material is displayed in the video frame. The specified action described above can be pouting, blinking, or a finger heart gesture, etc., For example, when a pouting action performed by a user is detected in a video frame, a balloon image material is displayed on the user's mouth in the video frame.

The above interaction ways for additional image material allow only the recognition of a single image, such as a head portion or a foot portion, and cannot achieve the recognition of both a head portion and a foot portion in a single video during the video shooting process. It is only possible to apply a plurality of additional image materials in video frames captured by a front camera when capturing video frames by the front camera, or apply a plurality of additional image materials in video frames captured by a rear camera when capturing video frames by the rear camera. In this way, the front and rear cameras are not treated differently, and when there are a plurality of additional image materials, both the front and rear cameras are provided with multiple 3 D (three dimension) additional image materials, which consumes a lot of equipment performance. For example, when there are two image materials, the front and rear cameras are provided with two image materials, which consumes a huge amount of performance on the terminal device.

In view of this, an embodiment of the present disclosure provides an image processing method that adopt different image editing processing ways in video frames captured by different cameras to achieve the use of multiple image editing effects in the same video captured by a front camera and a rear camera. That is, one image editing effect is used for video frames captured by the front camera, and another image editing effect is used for video frames captured by the rear camera, so as to optimize device performance. The following is a detailed introduction to the image processing method provided by an embodiment of the present application with reference to the accompanying drawings.

FIG. 1 is a flowchart of an image processing method in an embodiment of the present disclosure. The embodiment can be applicable to adding additional image materials to a video. The method can be performed by an image processing apparatus. The image processing apparatus can be implemented in software and/or hardware. The image processing apparatus can be configured in an electronic device.

For example, the electronic device can be a mobile terminal, a fixed terminal or a portable terminal, such as a mobile phone, a website, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/video camera, a positioning device, a television receiver, a radio broadcast receiver, an e-book device, a gaming device or any combination thereof, comprising accessories and peripherals of these devices or any combination thereof.

For another example: the electronic device may be a server, wherein the server can be a physical server or a cloud server; the server can be a server, or a server cluster.

As shown in FIG. 1, the image processing method provided in the embodiment of the present disclosure mainly comprises the following steps S101 to S106.

In step S101, a first initial video frame captured by a first camera is obtained in response to a startup operation on the first camera.

The first camera above and a second camera described below are two cameras provided in a same terminal device. The first camera and the second camera described below can be external cameras connected to the terminal device or built-in cameras of the terminal device. The above connection can be wired or wireless connection, which is not specifically limited in the embodiment. The built-in camera of the terminal device can be a front camera or a rear camera. For example, in the embodiment, the first camera described above is a front camera of the terminal device, and the second camera is a rear camera of the terminal device.

For example, the first camera may be a single camera or a group of cameras, and the number of cameras comprised in the first camera is not limited in the embodiment.

In some embodiments, responding to the startup operation on the first camera comprises: after detecting a user launching a media application and detecting the user's triggering operation on a target image editing effect, receiving a startup instruction for the first camera, and starting the first camera in response to the startup instruction.

In some embodiments, the responding to the startup operation on the first camera further comprise: after detecting the user's triggering operation on a camera switching button, receiving an startup instruction for the first camera if the first camera is in an off state, and starting the first camera in response to the startup instruction. The switching button described above can be a virtual button or a physical button, which is not limited in the embodiment.

For example, the first initial video frame can be understood as a video frame captured by the first camera without any processing. For another example, the first initial video frame can also be understood as a video frame that is captured by the first camera and subjected to preset processing that does not add an additional image material. The preset processing can be image beautification processing, such as dermabrasion, makeup, or filters, etc., The additional image material can be understood as content added to a video frame that does not belong to the video frame image. The additional image material can also be referred to as a prop material, an effect material, etc., which is not specifically limited in the embodiment.

The obtaining of the first initial video frame captured by the first camera may comprise: obtaining a first video frame captured by a front camera in real time.

In some embodiments, in a case where a video is captured with a target image editing effect applied, a first initial video frame captured by the first camera is obtained in response to a startup operation on the first camera.

For example, the image editing effect can be understood as an effect of adding an additional image material to a video frame. The target image editing effect can be understood as an image editing effect selected by a user.

In some embodiments, in a case where a video is captured with a target image editing effect applied, it can be understood that the user can enable the target image editing effect before the video is captured and use the target image editing effect to perform image editing processing on the captured video during the video shooting.

In some embodiments, a target image editing effect may be enabled by default when a user launches a media application, or may be enabled in response to the user's triggering operation on the target image editing effect after the media application is launched.

In step S102, a first image editing effect corresponding to the first camera is determined.

For example, the first image editing effect can be understood as an image editing effect that is applied when a video frame is captured by the first camera.

In some embodiments, the determining of the first image editing effect corresponding to the first camera comprises: using one image editing effect in a target image editing effect as the first image editing effect by default after obtaining the first initial video frame captured by the first camera.

In some embodiments, the determining of the first image editing effect corresponding to the first camera comprises: displaying a plurality of image editing effects comprised in a target image editing effect, and determining an image editing effect selected by a user as the first image editing effect corresponding to the first camera based on a selection operation of the user.

In step S103, image editing processing is performed on the first initial video frame according to the first image editing effect to obtain and display a first target video frame, wherein the first target video frame is an effect image showing an effect of applying the first image editing effect to the first initial video frame.

In the embodiment, according to the first image editing effect, the image editing processing is performed on the first initial video frame to obtain the first target video frame, which can be understood as applying the first image editing effect to the first initial video frame.

In some embodiments, the first image editing effect is to add an additional image material at a specified position in the first initial video frame. The specified position above can be a human body part such as eyes, mouth, head, hands, etc. in the first initial video frame, or a static object such as a building, flower, tree, etc. in the first initial video frame, which is not specifically limited in the embodiment.

In some embodiments, the first image editing effect is to add an additional image material at a specified position in the first initial video frame after the user completes a specified action. The specified action above can be an action such as blinking, pouting, waving, or kicking carried out by the user in the first initial video frame, which is not specifically limited in the embodiment.

In some embodiments, the performing of the image editing processing on the first initial video frame according to the first image editing effect to obtain the first target video frame comprises: detecting whether there is a first head image in the first initial video frame; and in response to detecting the first head image in the first initial video frame, performing the image editing processing on the first initial video frame according to the first image editing effect to obtain the first target video frame.

The first head image can be understood as a face image detected by image recognition in the first initial video frame. In the embodiment, three algorithms are provided, namely a face recognition algorithm, a foot recognition algorithm, and a full body recognition algorithm.

In some embodiments, the face recognition algorithm is bound to the first camera. That is, after detecting that the first camera is started, the face recognition algorithm is launched. Whether there is a head image in the first initial video frame is detected by the face recognition algorithm. How the face recognition algorithm performs head recognition is not specifically limited in the embodiment.

In some embodiments, the performing of the image editing processing on the first initial video frame according to the first image editing effect to obtain the first target video frame comprises: adding a first additional image material at a position corresponding to the first head image in the first initial video frame to obtain the first target video frame.

The first additional image material can be a virtual hat, a virtual hairpin, a virtual dangling ornament, a virtual hair clip, and a virtual hair ornament, etc. A style of the hat can be an animal-style hat, such as a tiger hat, rabbit hat, etc., or a regular hat, such as a baseball cap, etc.

For example, after a head image is recognized in the first initial video frame, the first additional image material is added at a head position. For example, For example, a virtual tiger hat is displayed at the head position.

In step S104, in response to a camera switching instruction, a second camera is switched to and a second initial video frame captured by the second camera is obtained.

For example, the camera switching instruction can be understood as an instruction to switch the current working camera to an off state and to switch an off-state camera to an on state.

In the embodiment, before responding to the camera switching instruction, the first camera is in the on state and the second camera is in the off state. After responding to the camera switching instruction, the first camera is switched from the on state to the off state, and the second camera is switched from the off state to the on state (i.e., the second camera is started).

The responding to the camera switching instruction may comprise, after a user operation on a camera switching button is detected, receiving a camera switching instruction, and in response to the switching instruction, shutting down the first camera and starting up the second camera, wherein the switching button may be a virtual button or a physical button, which is not limited in the embodiment.

For example, the second initial video frame can be understood as a video frame captured by the second camera. For another example, the second initial video frame can also be understood as a video frame that is captured by the second camera, and subjected to preset processing that does not add an additional image material. The preset processing can comprise image beautification, such as dermabrasion, makeup, or filters, etc.

The obtaining of the second video frame captured by the second camera may comprise: obtaining a second video frame captured by a rear camera in real time.

In step S105, a second image editing effect corresponding to the second camera is determined.

The second image editing effect can be understood as an image editing effect that is applied when a video frame is captured by the second camera.

In some embodiments, the determining of the second image editing effect corresponding to the second camera comprises: using one image editing effect in a target image editing effect as the second image editing effect by default after obtaining the second initial video frame captured by the second camera.

In some embodiments, the determining of the second image editing effect corresponding to the second camera comprises: displaying a plurality of image editing effects comprised in a target image editing effect, and determining an image editing effect selected by a user as the second image editing effect corresponding to the second camera based on a selection operation of the user.

In step S106, image editing processing is performed on the second initial video frame according to the second image editing effect to obtain and display a second target video frame, wherein the second target video frame is an effect image showing an effect of applying the second image editing effect to the second initial video frame.

In the embodiment, according to the second image editing effect, the image editing processing is performed on the second initial video frame to obtain the second target video frame, which can be understood as applying the second image editing effect to the second initial video frame.

In some embodiments, the second image editing effect is to add an additional image material at a specified position in the second initial video frame. The above specified position can be a human body part, such as a foot or a leg in the second initial video frame, which is not specifically limited in the embodiment.

In some embodiments, the performing of the image editing processing on the second initial video frame according to the second image editing effect to obtain the second target video frame comprises: detecting whether there is a foot image in the second initial video frame; and in response to detecting the foot image in the second initial video frame, performing the image editing processing on the second initial video frame according to the second image editing effect to obtain the second target video frame.

In the embodiment, three algorithms are provided, namely a face recognition algorithm, a foot recognition algorithm, and a full body recognition algorithm.

In some embodiments, the foot recognition algorithm is bound to the second camera. That is, after detecting that the second camera is started, the foot recognition algorithm is launched. Whether there is a foot image in the second initial video frame is detected by the foot recognition algorithm. How the foot recognition algorithm performs foot recognition is not specifically limited in the embodiment.

For example, the foot image can be a barefoot image or a foot image after wearing shoes, which is not limited in the embodiment.

In some embodiments, when the face recognition algorithm is enabled, the full body recognition algorithm is also enabled; and/or, when the foot recognition algorithm is enabled, the full body recognition algorithm is also enabled. The full body recognition algorithm is configured to assist the face recognition algorithm and/or the foot recognition algorithm to recognize an image, thereby improving the efficiency of image recognition.

In some embodiments, the performing of the image editing processing on the second initial video frame according to the second image editing effect to obtain the second target video frame comprises: adding a second additional image material at a position corresponding to the foot image in the second initial video frame to obtain the second target video frame.

For example, the second additional image material may be virtual shoes or the like. The style of shoes can be animal-style shoes, such as tiger claw style, rabbit foot style, or regular shoes, such as sports shoes.

In the embodiment, after a foot image is recognized in the second initial video frame, the second additional image material is added at a foot position. For example, virtual tiger claw shoes are displayed at the foot position.

In the embodiment, a face recognition algorithm, a foot recognition algorithm, and a full body recognition algorithm are provided. The hat and shoe effects are treated differently by the front and rear cameras. In the case of the front camera, only a virtual hat is recognized to appear on the head, giving priority to ensure the display effect of the hat; when the user switches to the rear camera to get a larger shooting space, virtual shoes appear by default. The two cameras are treated differently when there are a plurality of additional image materials, that is, different additional image materials are displayed in the video frames captured by the two cameras (i.e., the first additional image material is different from the second additional image material), thereby optimizing the performance of the terminal device.

An embodiment of the present disclosure provides an image processing method, comprising: obtaining a first initial video frame captured by a first camera in response to a startup operation on the first camera; determining a first image editing effect corresponding to the first camera; performing image editing processing on the first initial video frame according to the first image editing effect to obtain and display a first target video frame, wherein the first target video frame is an effect image showing an effect of applying the first image editing effect to the first initial video frame; in response to a camera switching instruction, switching to a second camera and obtaining a second initial video frame captured by the second camera; determining a second image editing effect corresponding to the second camera; and performing image editing processing on the second initial video frame according to the second image editing effect to obtain and display a second target video frame, wherein the second target video frame is an effect image showing an effect of applying the second image editing effect to the second initial video frame. In the embodiment of the present disclosure, different image editing processing methods are used for the video frames captured by different cameras. For example, the first image editing effect is different from the second image editing effect. Thus, a plurality of image editing effects are used in the same video captured by the front camera and the rear camera. That is, one image editing effect is used for a video captured by the front camera, and another image editing effect is used for a video captured by the rear camera, so as to optimize the performance of the terminal device.

Figure 2:
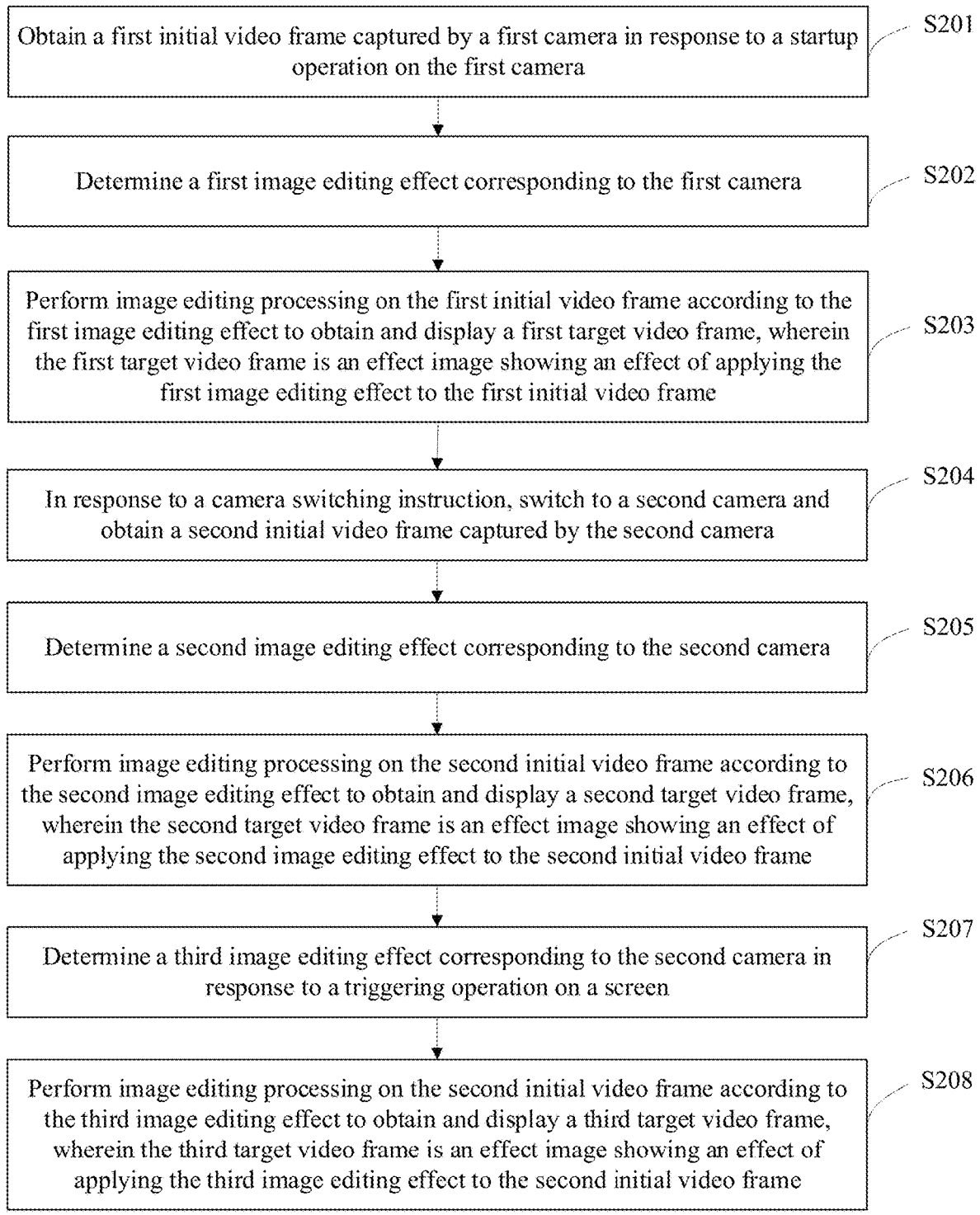
FIG. 2 is a flowchart of another image processing method in an embodiment of the present disclosure.

On the basis of the above embodiment, an embodiment of the present disclosure further optimizes the image processing method described above. As shown in FIG. 2. the optimized image processing method of the present disclosure mainly comprises steps S201 to S208.

In step S201, a first initial video frame captured by a first camera is obtained in response to a startup operation on the first camera.

In step S202, a first image editing effect corresponding to the first camera is determined.

In step S203, image editing processing is performed on the first initial video frame according to the first image editing effect to obtain and display a first target video frame, wherein the first target video frame is an effect image showing an effect of applying the first image editing effect to the first initial video frame.

In step S204, in response to a camera switching instruction, a second camera is switched to and a second initial video frame captured by the second camera is obtained.

In step S205, a second image editing effect corresponding to the second camera is determined.

In step S206, image editing processing is performed on the second initial video frame according to the second image editing effect to obtain and display a second target video frame, wherein the second target video frame is an effect image showing an effect of applying the second image editing effect to the second initial video frame.

In the embodiment, an execution method of steps S201-S206 is the same as an execution method of steps S101-S106 in the above embodiment. Please refer to the description in the above embodiment for details, which will not be repeated in the embodiment.

In step S207, a third image editing effect corresponding to the second camera is determined in response to a triggering operation on a screen.

The screen refers to a touch screen that can receive an operation signal, and a size and type of the screen are not specifically limited in the embodiment. After the triggering operation on the screen is detected, a response is made to the triggering operation on the screen. The triggering operation on the screen may be a click or double-click operation on the screen.

The third image editing effect can be the same or different from the first image editing effect. The third image editing effect is different from the second image editing effect. In some embodiments, the third image editing effect may be the same as the first image editing effect.

In some embodiments, in a case where the second camera is started, in response to the triggering operation on the screen, one image editing effect in a target image editing effect is used as the third image editing effect by default.

In step S208, image editing processing is performed on the second initial video frame according to the third image editing effect to obtain and display a third target video frame, wherein the third target video frame is an effect image showing an effect of applying the third image editing effect to the second initial video frame.

In the embodiment, according to the third image editing effect, image editing processing is performed on the second initial video frame to obtain the third target video frame, which can be understood as applying the third image editing effect to the second initial video frame.

In some embodiments, the third image editing effect is to add an additional image material at a specified position in the second initial video frame. The specified position above can be a human body part such as eyes, mouth, head, hands, etc. in the second initial video frame, or a static object such as a building, flower, tree, etc. in the second initial video frame, which is not specifically limited in the embodiment.

In some embodiments, the performing of the image editing processing on the second initial video frame according to the third image editing effect to obtain and display the third target video frame comprises: detecting whether there is a second head image in the second initial video frame; and in response to detecting the second head image in the second initial video frame, performing the image editing processing on the second initial video frame according to the third image editing effect to obtain and display the third target video frame.

The second head image can be understood as a head image detected by image recognition in the second initial video frame. In some embodiments, whether there is a head image in the second initial video frame is detected by a face recognition algorithm. How the face recognition algorithm performs head recognition is not specifically limited in the embodiment.

In some embodiments, the performing of the image editing processing on the second initial video frame according to the third image editing effect to obtain the third target video frame comprises: adding a third additional image material at a position corresponding to the second head image in the second initial video frame to obtain the third target video frame.

For example, the third additional image material can be a virtual hat, a virtual hairpin, a virtual dangling ornament, a virtual hair clip, and a virtual hair ornament, etc., A style of the hat can be an animal-style hat, such as a tiger hat, rabbit hat, etc., or a regular hat, such as a baseball cap, etc.

In some embodiments, after a head image is recognized in the second initial video frame, a third additional image material is added at a head position. For example, a virtual tiger hat is displayed at the head position.

After the user loads a sticker, the front camera is started by default, and when a face image is detected, a tiger hat is displayed on the screen. After the user switches to the rear camera and a foot image is detected, tiger shoes are displayed on the screen. After the user clicks on the screen, it is detected whether there is a face image, and after a face image is detected, a tiger hat is displayed on the screen.

On the basis of the above embodiment, the image processing method provided in an embodiment of the present disclosure further comprises: displaying guidance information in response to detecting that a user uses an additional image material package for a first time, wherein the guidance information is configured to prompt the user on the method of use of the additional image material package.

The guidance information can be either video or audio, or a combination of both. The guidance information is used to inform the user that a tiger hat is available for face shooting and tiger shoes are available for foot shooting. After the user switches to the rear camera, for which tiger shoes are displayed by default, the guidance information can also be used to indicate that the user can switch between tiger shoes and a tiger hat by clicking on the screen again in a case of the rear camera.

In the embodiment, by playing guidance information, the user can be made aware of the usage of the image editing effects, thereby improving the user experience.

Figure 3:
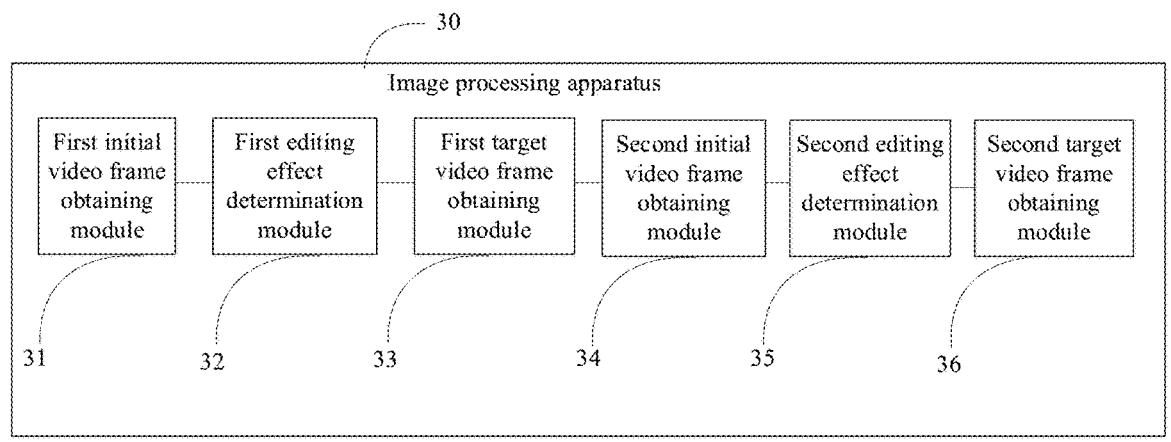
FIG. 3 is a schematic structural diagram of an image processing apparatus in an embodiment of the present disclosure.

FIG. 3 is a schematic structural diagram of an image processing apparatus in an embodiment of the present disclosure. The embodiment can be applicable to a case of adding a virtual effect prop to a video, and the image processing apparatus can be implemented in software and/or hardware, and can be configured in an electronic device.

As shown in FIG. 3, an image processing apparatus 30 provided in an embodiment of the present disclosure mainly comprises: a first initial video frame obtaining module 31, a first editing effect determination module 32, a first target video frame obtaining module 33, a second initial video frame obtaining module 34, a second editing effect determination module 35, and a second target video frame obtaining module 36.

The first initial video frame obtaining module 31 is configured to obtain a first initial video frame captured by a first camera in response to a startup operation on the first camera.

The first editing effect determination module 32 is configured to determine a first image editing effect corresponding to the first camera.

The first target video frame obtaining module 33 is configured to perform image editing processing on the first initial video frame according to the first image editing effect to obtain and display a first target video frame, wherein the first target video frame is an effect image showing an effect of applying the first image editing effect to the first initial video frame.

The second initial video frame obtaining module 34 is configured to, in response to a camera switching instruction, switch to a second camera and obtain a second initial video frame captured by the second camera.

The second editing effect determination module 35 is configured to determine a second image editing effect corresponding to the second camera.

The second target video frame obtaining module 36 is configured to perform image editing processing on the second initial video frame according to the second image editing effect to obtain and display a second target video frame, wherein the second target video frame is an effect image showing an effect of applying the second image editing effect to the second initial video frame.

In some embodiments, the first target video frame obtaining module 33 comprises: a first head image detection unit configured to detect whether there is a first head image in the first initial video frame; and a first target video frame obtaining unit configured to, in response to detecting the first head image in the first initial video frame, perform the image editing processing on the first initial video frame according to the first image editing effect to obtain the first target video frame.

In some embodiments, the first target video frame obtaining unit is configured to add a first additional image material at a position corresponding to the first head image in the first initial video frame to obtain the first target video frame.

In some embodiments, the second target video frame obtaining module 36 comprises: a foot image detection unit configured to detect whether there is a foot image in the second initial video frame; and a second target video frame obtaining unit configured to, in response to detecting the foot image in the second initial video frame, perform the image editing processing on the second initial video frame according to the second image editing effect to obtain the second target video frame.

In some embodiments, the second target video frame obtaining unit is configured to add a second additional image material at a position corresponding to the foot image in the second initial video frame to obtain the second target video frame.

In some embodiments, the first editing effect determination module 32 is configured to: use one image editing effect in a target image editing effect as the first image editing effect by default after obtaining the first initial video frame captured by the first camera; or display a plurality of image editing effects comprised in a target image editing effect, and determine an image editing effect selected by a user as the first image editing effect corresponding to the first camera based on a selection operation of the user.

In some embodiments, the second editing effect determination module 35 is configured to: use one image editing effect in a target image editing effect as the second image editing effect by default after obtaining the second initial video frame captured by the second camera; or display a plurality of image editing effects comprised in a target image editing effect, and determine an image editing effect selected by a user as the second image editing effect corresponding to the second camera based on a selection operation of the user.

In some embodiments, the apparatus further comprises: a third image editing effect determination module configured to determine a third image editing effect corresponding to the second camera in response to a triggering operation on a screen; and a third target video frame obtaining module configured to perform image editing processing on the second initial video frame according to the third image editing effect to obtain and display a third target video frame.

In some embodiments, the third target video frame obtaining module comprises: a second head image detection unit configured to detect whether there is a second head image in the second initial video frame; and a third target video frame obtaining unit configured to, in response to detecting the second head image in the second initial video frame, perform the image editing processing on the second initial video frame according to the third image editing effect to obtain and display the third target video frame.

In some embodiments, the third target video frame obtaining unit is configured to add a third additional image material at a position corresponding to the second head image in the second initial video frame to obtain the third target video frame.

In some embodiments, the first image editing effect is different from the second image editing effect.

In some embodiments, the third image editing effect is different from the second image editing effect.

In some embodiments, the apparatus further comprises: a guidance information display module configured to display guidance information in response to detecting that a user uses an additional image material package for a first time, wherein the guidance information is configured to prompt the user on a method of use of the additional image material package.

The image processing apparatus provided in the embodiment of the present disclosure can perform the steps of the image processing method provided in an embodiment of the present disclosure. The steps involved and the beneficial effect achieved will not be described in detail.

Figure 4:
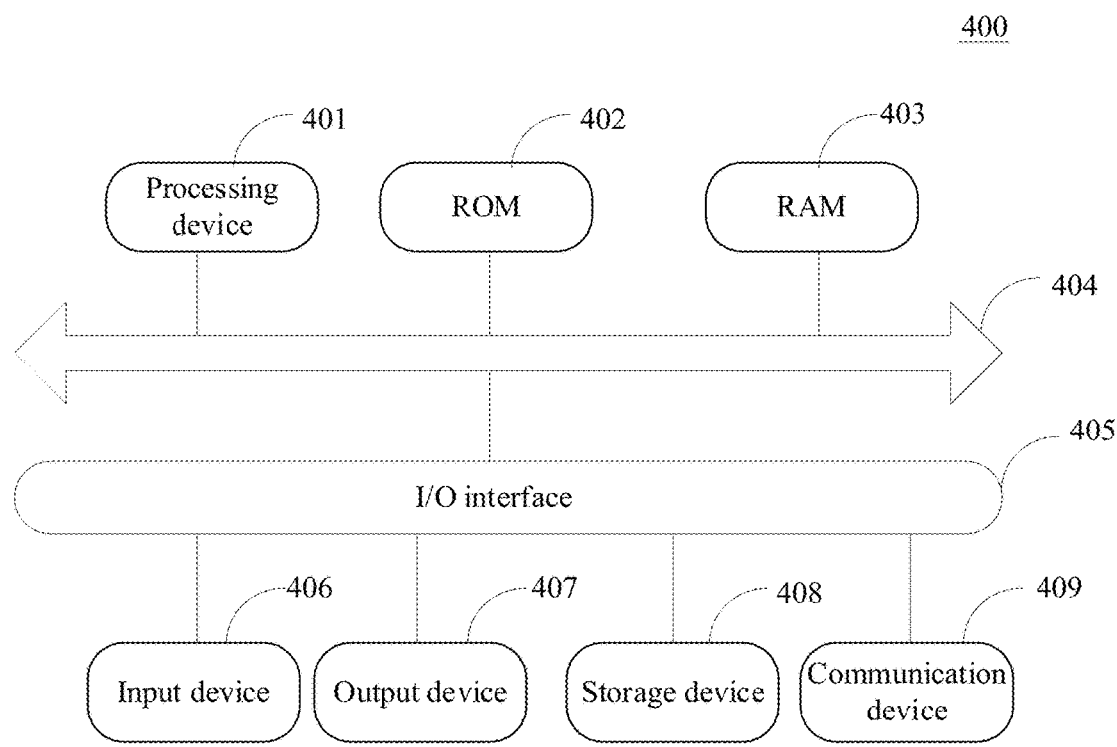
FIG. 4 is a schematic structural diagram of an electronic device in an embodiment of the present disclosure.

FIG. 4 is a schematic structural diagram of an electronic device in an embodiment of the present disclosure. Referring to FIG. 4, a schematic structural diagram of an electronic device 400 suitable for implementing the embodiments of the present disclosure is shown. The electronic device 400 in the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or a wearable electronic device, and a fixed terminal such as a digital TV, a desktop computer, or a smart-home device. The electronic device shown in FIG. 4 is merely an example and should not impose any limitation on the function and scope of the embodiments of the present disclosure.

As shown in FIG. 4, the electronic device 400 may comprise a processing device (e.g., a central processing unit, a graphics processor, etc.) 401, which may perform various appropriate actions and processes to implement the image processing method of the embodiment of the present disclosure according to a program stored in Read Only Memory (ROM) 402 or a program loaded from storage device 408 into Random Access Memory (RAM) 403. In RAM 403, various programs and data required for the operation of the electronic device 400 are also stored. Processing device 401, ROM 402 and RAM 403 are connected to each other through bus 404. An input/output (I/O) interface 405 is also connected to the bus 404.

Generally, the following devices can be connected to I/O interface 405: an input device 406 comprising, for example, a touch screen, a touch pad, a keyboard, a mouse, a camera, a microphone, an accelerometer, a gyroscope, etc; an output device 407 comprising a liquid crystal display (LCD), a speaker, a vibrator, etc.; a storage device 408 such as a magnetic tape, a hard disk, etc; and a communication device 409. The communication device 409 enables the terminal device 400 to communicate in a wireless or wired manner with other devices to exchange data. Although FIG. 4 shows the electronic device 400 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart to implement the above image processing method. In such an embodiment, the computer program may be downloaded and installed from the network through the communication device 409, or installed from the storage device 408, or from the ROM 402. When the computer program is executed by the processing device 401, the above functions defined in the method of the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN"), a wide area network ("WAN"), the Internet, and end-to-end networks (for example, ad hoc end-to-end networks), as well as any currently known or future developed networks.

The above computer readable medium may be comprised in the electronic device described above; or it may exist alone without being assembled into the electronic device.

The computer readable medium carries one or more programs that, when executed by the terminal device, cause the terminal device to: obtain a first initial video frame captured by a first camera in response to a startup operation on the first camera; determine a first image editing effect corresponding to the first camera; perform image editing processing on the first initial video frame according to the first image editing effect to obtain and display a first target video frame, wherein the first target video frame is an effect image showing an effect of applying the first image editing effect to the first initial video frame; in response to a camera switching instruction, switch to a second camera and obtain a second initial video frame captured by the second camera; determine a second image editing effect corresponding to the second camera; and perform image editing processing on the second initial video frame according to the second image editing effect to obtain and display a second target video frame, wherein the second target video frame is an effect image showing an effect of applying the second image editing effect to the second initial video frame.

Optionally, when the terminal device performs the above one or more programs, the terminal device may also perform other steps in the above embodiments.

The computer program code for executing operations of the present disclosure may be written by one or more program design languages or a combination thereof, the program design languages comprising but not limited to object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In a case of a remote computer, the remote computer may be connected to the user computer through various kinds of networks, comprising local area network (LAN) or wide area network (WAN), or connected to external computer (for example using an internet service provider via Internet).

The flowchart and block diagram in the drawings illustrate the architecture, function and operation of possible implementation of a system, method and computer program product according to various embodiments of the present disclosure. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. The names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides an image processing method, comprising: obtaining a first initial video frame captured by a first camera in response to a startup operation on the first camera; determining a first image editing effect corresponding to the first camera; performing image editing processing on the first initial video frame according to the first image editing effect to obtain and display a first target video frame, wherein the first target video frame is an effect image showing an effect of applying the first image editing effect to the first initial video frame; in response to a camera switching instruction, switching to a second camera and obtaining a second initial video frame captured by the second camera; determining a second image editing effect corresponding to the second camera; and performing image editing processing on the second initial video frame according to the second image editing effect to obtain and display a second target video frame, wherein the second target video frame is an effect image showing an effect of applying the second image editing effect to the second initial video frame.

According to one or more embodiments of the present disclosure, the present disclosure provides an image processing method, wherein the performing of the image editing processing on the first initial video frame according to the first image editing effect to obtain the first target video frame comprises: detecting whether there is a first head image in the first initial video frame; and in response to detecting the first head image in the first initial video frame, performing the image editing processing on the first initial video frame according to the first image editing effect to obtain the first target video frame.

According to one or more embodiments of the present disclosure, the present disclosure provides an image processing method, wherein the performing of the image editing processing on the first initial video frame according to the first image editing effect to obtain the first target video frame comprises: adding a first additional image material at a position corresponding to the first head image in the first initial video frame to obtain the first target video frame.

According to one or more embodiments of the present disclosure, the present disclosure provides an image processing method, wherein the performing of the image editing processing on the second initial video frame according to the second image editing effect to obtain the second target video frame comprises: detecting whether there is a foot image in the second initial video frame; and in response to detecting the foot image in the second initial video frame, performing the image editing processing on the second initial video frame according to the second image editing effect to obtain the second target video frame.

According to one or more embodiments of the present disclosure, the present disclosure provides an image processing method, wherein the performing of the image editing processing on the second initial video frame according to the second image editing effect to obtain the second target video frame comprises: adding a second additional image material at a position corresponding to the foot image in the second initial video frame to obtain the second target video frame.

According to one or more embodiments of the present disclosure, the present disclosure provides an image processing method, wherein the determining of the first image editing effect corresponding to the first camera comprises: using one image editing effect in a target image editing effect as the first image editing effect by default after obtaining the first initial video frame captured by the first camera; or displaying a plurality of image editing effects comprised in a target image editing effect, and determining an image editing effect selected by a user as the first image editing effect corresponding to the first camera based on a selection operation of the user.

According to one or more embodiments of the present disclosure, the present disclosure provides an image processing method, wherein the determining of the second image editing effect corresponding to the second camera comprises: using one image editing effect in a target image editing effect as the second image editing effect by default after obtaining the second initial video frame captured by the second camera; or displaying a plurality of image editing effects comprised in a target image editing effect, and determining an image editing effect selected by a user as the second image editing effect corresponding to the second camera based on a selection operation of the user.

According to one or more embodiments of the present disclosure, the present disclosure provides an image processing method, the method further comprising: after performing the image editing processing on the second initial video frame according to the second image editing effect to obtain and display the second target video frame, determining a third image editing effect corresponding to the second camera in response to a triggering operation on a screen; and performing image editing processing on the second initial video frame according to the third image editing effect to obtain and display a third target video frame According to one or more embodiments of the present disclosure, the present disclosure provides an image processing method, wherein the performing of the image editing processing on the second initial video frame according to the third image editing effect to obtain and display the third target video frame comprises: detecting whether there is a second head image in the second initial video frame; and in response to detecting the second head image in the second initial video frame, performing the image editing processing on the second initial video frame according to the third image editing effect to obtain and display the third target video frame.

According to one or more embodiments of the present disclosure, the present disclosure provides an image processing method, wherein the performing of the image editing processing on the second initial video frame according to the third image editing effect to obtain the third target video frame comprises: adding a third additional image material at a position corresponding to the second head image in the second initial video frame to obtain the third target video frame.

According to one or more embodiments of the present disclosure, the present disclosure provides an image processing method, wherein the first image editing effect is different from the second image editing effect.

According to one or more embodiments of the present disclosure, the present disclosure provides an image processing method, wherein the third image editing effect is different from the second image editing effect.

According to one or more embodiments of the present disclosure, the present disclosure provides an image processing method, further comprising: displaying guidance information in response to detecting that a user uses an additional image material package for a first time, wherein the guidance information is configured to prompt the user on a method of use of the additional image material package.

According to one or more embodiments of the present disclosure, the present disclosure provides an image processing apparatus, comprising: a first initial video frame obtaining module configured to obtain a first initial video frame captured by a first camera in response to a startup operation on the first camera; a first editing effect determination module configured to determine a first image editing effect corresponding to the first camera; a first target video frame obtaining module configured to perform image editing processing on the first initial video frame according to the first image editing effect to obtain and display a first target video frame, wherein the first target video frame is an effect image showing an effect of applying the first image editing effect to the first initial video frame; a second initial video frame obtaining module configured to, in response to a camera switching instruction, switch to a second camera and obtain a second initial video frame captured by the second camera; a second editing effect determination module configured to determine a second image editing effect corresponding to the second camera; and a second target video frame obtaining module configured to perform image editing processing on the second initial video frame according to the second image editing effect to obtain and display a second target video frame, wherein the second target video frame is an effect image showing an effect of applying the second image editing effect to the second initial video frame.

According to one or more embodiments of the present disclosure, the present disclosure provides an image processing apparatus, wherein the first target video frame obtaining module comprises: a first head image detection unit configured to detect whether there is a first head image in the first initial video frame; and a first target video frame obtaining unit configured to, in response to detecting the first head image in the first initial video frame, perform the image editing processing on the first initial video frame according to the first image editing effect to obtain the first target video frame.

According to one or more embodiments of the present disclosure, the present disclosure provides an image processing apparatus, wherein the first target video frame obtaining unit is configured to add a first additional image material at a position corresponding to the first head image in the first initial video frame to obtain the first target video frame.

According to one or more embodiments of the present disclosure, the second target video frame obtaining module comprises: a foot image detection unit configured to detect whether there is a foot image in the second initial video frame; and a second target video frame obtaining unit configured to, in response to detecting the foot image in the second initial video frame, perform the image editing processing on the second initial video frame according to the second image editing effect to obtain the second target video frame.

According to one or more embodiments of the present disclosure, the present disclosure provides an image processing apparatus, wherein the second target video frame obtaining unit is configured to add a second additional image material at a position corresponding to the foot image in the second initial video frame to obtain the second target video frame.

According to one or more embodiments of the present disclosure, the present disclosure provides an image processing apparatus, wherein the first editing effect determination module is configured to: use one image editing effect in a target image editing effect as the first image editing effect by default after obtaining the first initial video frame captured by the first camera; or display a plurality of image editing effects comprised in a target image editing effect, and determine an image editing effect selected by a user as the first image editing effect corresponding to the first camera based on a selection operation of the user.

According to one or more embodiments of the present disclosure, the present disclosure provides an image processing apparatus, wherein the second editing effect determination module is configured to: use one image editing effect in a target image editing effect as the second image editing effect by default after obtaining the second initial video frame captured by the second camera; or display a plurality of image editing effects comprised in a target image editing effect, and determine an image editing effect selected by a user as the second image editing effect corresponding to the second camera based on a selection operation of the user.

According to one or more embodiments of the present disclosure, the present disclosure provides an image processing apparatus, further comprising: a third image editing effect determination module configured to determine a third image editing effect corresponding to the second camera in response to a triggering operation on a screen; and a third target video frame obtaining module configured to perform image editing processing on the second initial video frame according to the third image editing effect to obtain and display a third target video frame.

According to one or more embodiments of the present disclosure, the present disclosure provides an image processing apparatus, wherein the third target video frame obtaining module comprises: a second head image detection unit configured to detect whether there is a second head image in the second initial video frame; and a third target video frame obtaining unit configured to, in response to detecting the second head image in the second initial video frame, perform the image editing processing on the second initial video frame according to the third image editing effect to obtain and display the third target video frame.

According to one or more embodiments of the present disclosure, the present disclosure provides an image processing apparatus, wherein the third target video frame obtaining unit is configured to add a third additional image material at a position corresponding to the second head image in the second initial video frame to obtain the third target video frame.

According to one or more embodiments of the present disclosure, the present disclosure provides an image processing apparatus, wherein the first image editing effect is different from the second image editing effect.

According to one or more embodiments of the present disclosure, the present disclosure provides an image processing apparatus, wherein the third image editing effect is different from the second image editing effect.

According to one or more embodiments of the present disclosure, the present disclosure provides an image processing apparatus, further comprising: a guidance information display module configured to display guidance information in response to detecting that a user uses an additional image material package for a first time, wherein the guidance information is configured to prompt the user on a method of use of the additional image material package.

According to one or more embodiments of the present disclosure, the present disclosure provides an electronic device, comprising: one or more processors; and a storage device configured to store one or more programs that, when executed by the one or more processors, cause the one or more processors to implement the image processing method provided by any embodiment of the present disclosure.

According to one or more embodiments of the present disclosure, the present disclosure provides a computer-readable storage medium (e.g., non-transitory computer-readable storage medium) stored thereon a computer program that, when executed by a processor, implements the image processing method provided by any embodiment of the present disclosure.

An embodiment of the present disclosure further provides a computer program product comprising computer programs or instructions that, when executed by a processor, implement the above image processing method.

An embodiment of the present disclosure further provides a computer program, comprising: instructions that, when executed by a processor, cause the processor to perform the image processing method described above.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

The invention claimed is:

1. An image processing method, comprising:
obtaining a first initial video frame captured by a first camera in response to a startup operation on the first camera;
determining a first image editing effect corresponding to the first camera, wherein the first image editing effect is to add a first additional image material at a specified position in the first initial video frame;
performing image editing processing on the first initial video frame according to the first image editing effect to obtain and display a first target video frame, wherein the first target video frame is an effect image showing an effect of applying the first image editing effect to the first initial video frame;
in response to a camera switching instruction, switching to a second camera and obtaining a second initial video frame captured by the second camera;
determining a second image editing effect corresponding to the second camera, wherein the second image editing effect is to add a second additional image material at a specified position in the second initial video frame, and the first additional image material is different from the second additional image material; and
performing image editing processing on the second initial video frame according to the second image editing effect to obtain and display a second target video frame, wherein the second target video frame is an effect image showing an effect of applying the second image editing effect to the second initial video frame, and the first target video frame and the second initial video frame belong to a same video.

2. The image processing method according to claim 1, wherein the performing of the image editing processing on the first initial video frame according to the first image editing effect to obtain the first target video frame comprises:
    detecting whether there is a first head image in the first initial video frame; and
    in response to detecting the first head image in the first initial video frame, performing the image editing processing on the first initial video frame according to the first image editing effect to obtain the first target video frame.

3. The image processing method according to claim 2, wherein the performing of the image editing processing on the first initial video frame according to the first image editing effect to obtain the first target video frame comprises:
    adding the first additional image material at the specified position corresponding to the first head image in the first initial video frame to obtain the first target video frame.

4. The image processing method according to claim 1, wherein the performing of the image editing processing on the second initial video frame according to the second image editing effect to obtain the second target video frame comprises:
    detecting whether there is a foot image in the second initial video frame; and
    in response to detecting the foot image in the second initial video frame, performing the image editing processing on the second initial video frame according to the second image editing effect to obtain the second target video frame.

5. The image processing method according to claim 4, wherein the performing of the image editing processing on the second initial video frame according to the second image editing effect to obtain the second target video frame comprises:
    adding the second additional image material at the specified position corresponding to the foot image in the second initial video frame to obtain the second target video frame.

6. The image processing method according to claim 1, wherein the determining of the first image editing effect corresponding to the first camera comprises:
    using one image editing effect in a target image editing effect as the first image editing effect by default after obtaining the first initial video frame captured by the first camera; or
    displaying a plurality of image editing effects comprised in a target image editing effect, and determining an image editing effect selected by a user as the first image editing effect corresponding to the first camera based on a selection operation of the user.

7. The image processing method according to claim 1, wherein the determining of the second image editing effect corresponding to the second camera comprises:
    using one image editing effect in a target image editing effect as the second image editing effect by default after obtaining the second initial video frame captured by the second camera; or
    displaying a plurality of image editing effects comprised in a target image editing effect, and determining an image editing effect selected by a user as the second image editing effect corresponding to the second camera based on a selection operation of the user.

8. The image processing method according to claim 1, further comprising:
    after performing the image editing processing on the second initial video frame according to the second image editing effect to obtain and display the second target video frame, determining a third image editing effect corresponding to the second camera in response to a triggering operation on a screen; and
    performing image editing processing on the second initial video frame according to the third image editing effect to obtain and display a third target video frame, wherein the third target video frame is an effect image showing an effect of applying the third image editing effect to the second initial video frame.

9. The image processing method according to claim 8, wherein the performing of the image editing processing on the second initial video frame according to the third image editing effect to obtain and display the third target video frame comprises:
    detecting whether there is a second head image in the second initial video frame; and
    in response to detecting the second head image in the second initial video frame, performing the image editing processing on the second initial video frame according to the third image editing effect to obtain and display the third target video frame.

10. The image processing method according to claim 9, wherein the performing of the image editing processing on the second initial video frame according to the third image editing effect to obtain the third target video frame comprises:
    adding a third additional image material at a position corresponding to the second head image in the second initial video frame to obtain the third target video frame.

11. The image processing method according to claim 8, wherein the third image editing effect is different from the second image editing effect.

12. The image processing method according to claim 1, wherein the first image editing effect is different from the second image editing effect.

13. The image processing method according to claim 1, further comprising:
    displaying guidance information in response to detecting that a user uses an additional image material package for a first time, wherein the guidance information is configured to prompt the user on a method of use of the additional image material package.

14. An electronic device, comprising:
    one or more processors; and
    a storage device configured to store one or more programs that, when executed by the one or more processors, cause the one or more processors to:
        obtain a first initial video frame captured by a first camera in response to a startup operation on the first camera;
        determine a first image editing effect corresponding to the first camera, wherein the first image editing effect is to add a first additional image material at a specified position in the first initial video frame;
        perform image editing processing on the first initial video frame according to the first image editing effect to obtain and display a first target video frame, wherein the first target video frame is an effect image showing an effect of applying the first image editing effect to the first initial video frame;

in response to a camera switching instruction, switch to a second camera and obtain a second initial video frame captured by the second camera;

determine a second image editing effect corresponding to the second camera, wherein the second image editing effect is to add a second additional image material at a specified position in the second initial video frame, and the first additional image material is different from the second additional image material; and perform image editing processing on the second initial video frame according to the second image editing effect to obtain and display a second target video frame, wherein the second target video frame is an effect image showing an effect of applying the second image editing effect to the second initial video frame, and the first target video frame and the second initial video frame belong to a same video.

15. The electronic device according to claim 14, wherein the one or more programs, when executed by the one or more processors, cause the one or more processors to:
   detect whether there is a first head image in the first initial video frame; and
   in response to detecting the first head image in the first initial video frame, perform the image editing processing on the first initial video frame according to the first image editing effect to obtain the first target video frame.

16. The electronic device according to claim 15, wherein the one or more programs, when executed by the one or more processors, cause the one or more processors to:
   add the first additional image material at the specified position corresponding to the first head image in the first initial video frame to obtain the first target video frame.

17. The electronic device according to claim 14, wherein the one or more programs, when executed by the one or more processors, cause the one or more processors to:
   detect whether there is a foot image in the second initial video frame; and
   in response to detecting the foot image in the second initial video frame, perform the image editing processing on the second initial video frame according to the second image editing effect to obtain the second target video frame.

18. A non-transitory computer-readable storage medium stored thereon a computer program that, when executed by a processor, causes the processor to:
   obtain a first initial video frame captured by a first camera in response to a startup operation on the first camera;
   determine a first image editing effect corresponding to the first camera, wherein the first image editing effect is to add a first additional image material at a specified position in the first initial video frame;
   perform image editing processing on the first initial video frame according to the first image editing effect to obtain and display a first target video frame, wherein the first target video frame is an effect image showing an effect of applying the first image editing effect to the first initial video frame;
   in response to a camera switching instruction, switch to a second camera and obtain a second initial video frame captured by the second camera;
   determine a second image editing effect corresponding to the second camera, wherein the second image editing effect is to add a second additional image material at a specified position in the second initial video frame, and the first additional image material is different from the second additional image material; and
   perform image editing processing on the second initial video frame according to the second image editing effect to obtain and display a second target video frame, wherein the second target video frame is an effect image showing an effect of applying the second image editing effect to the second initial video frame, and the first target video frame and the second initial video frame belong to a same video.

19. The non-transitory computer-readable storage medium according to claim 18, wherein the computer program, when executed by the processor, causes the processor to:
   detect whether there is a first head image in the first initial video frame; and
   in response to detecting the first head image in the first initial video frame, perform the image editing processing on the first initial video frame according to the first image editing effect to obtain the first target video frame.

20. The non-transitory computer-readable storage medium according to claim 19, wherein the computer program, when executed by the processor, causes the processor to:
   add the first additional image material at the specified position corresponding to the first head image in the first initial video frame to obtain the first target video frame.

* * * * *